United States Patent
Janczak et al.

(10) Patent No.: US 7,107,894 B2
(45) Date of Patent: Sep. 19, 2006

(54) DEVICE TO MAGNETICALLY TREAT BEVERAGES

(76) Inventors: Andrew S. Janczak, 25 Adam Rd., West Massapequa, NY (US) 11758; Anthony R. Mantella, P.O. Box 1511, Newtown, PA (US) 18940

(\*) Notice: Subject to any disclaimer, the term of this patent is extended or adjusted under 35 U.S.C. 154(b) by 2 days.

(21) Appl. No.: 10/621,563

(22) Filed: Jul. 18, 2003

(65) Prior Publication Data

US 2005/0011363 A1    Jan. 20, 2005

(51) Int. Cl.
  *C12G 1/00* (2006.01)
  *C12H 1/22* (2006.01)
  *B03C 1/02* (2006.01)

(52) U.S. Cl. .................. 99/277.1; 99/277; 210/222

(58) Field of Classification Search ............... 99/275, 99/277.1, 277; 210/222, 223, 695; 426/237, 426/330.4, 592; 335/266, 303, 306
See application file for complete search history.

(56) References Cited

U.S. PATENT DOCUMENTS

| | | | |
|---|---|---|---|
| 655,413 A | 8/1900 | Parkyn | |
| 4,605,498 A | 8/1986 | Kulish | |
| 4,872,401 A | 10/1989 | Lee | |
| 4,888,113 A | 12/1989 | Holcomb | |
| 4,894,153 A * | 1/1990 | Shirdavant | 210/222 |
| 5,037,546 A | 8/1991 | Janczak et al. | |
| 5,113,751 A * | 5/1992 | Holcomb et al. | 99/286 |
| 5,118,416 A | 6/1992 | Janczak et al. | |
| 5,124,045 A | 6/1992 | Janczak et al. | |
| 5,320,751 A * | 6/1994 | Burns | 210/222 |
| 5,500,121 A | 3/1996 | Thornton et al. | |
| 5,534,156 A | 7/1996 | Sanderson | |
| 5,556,654 A | 9/1996 | Fregeau | |
| 5,804,068 A | 9/1998 | Reed | |
| 5,860,353 A | 1/1999 | Ceccarani | |
| 6,008,710 A | 12/1999 | Coates | |
| 6,231,759 B1 | 5/2001 | Sato | |
| 6,287,614 B1 | 9/2001 | Peiffer | |
| 6,390,319 B1 | 5/2002 | Yu | |
| 2003/0003189 A1 | 1/2003 | Lutzker | |

FOREIGN PATENT DOCUMENTS

| | | | |
|---|---|---|---|
| JP | 401148175 A | | 6/1989 |
| JP | 2001113283 | * | 4/2001 |
| JP | 2002102859 | * | 4/2002 |

OTHER PUBLICATIONS

Vino.Magnetis M, Wine X Magazine, vol. 3.4, Jun./Jul. 1999, X Publishing, Inc., Santa Rosa, California.
Magnetizer © Flavoring, www.magnetizer.net, Products link→Just for Fun link, Fountainville, Pennsylvania, MGI © 2001.

\* cited by examiner

*Primary Examiner*—Reginald L. Alexander
(74) *Attorney, Agent, or Firm*—Breiner & Breiner, L.L.C.

(57) ABSTRACT

The present invention is a device to magnetically treat beverages by fastening to a beverage container. The present invention is preferably a magnetic fastener constructed and arranged to be attached to the neck of a wine bottle. The magnetic fastener comprises two semi-cylindrical halves, a spring mechanism connecting the semi-cylindrical halves and a plurality of magnets. Each semi-cylindrical half may preferably have a fastening end and a grasping end, wherein each fastening end may contain three columns of magnets which may preferably be substantially evenly spaced in the fastening end of the semi-cylindrical half. The magnets may preferably be aligned so that the polarity runs through the device, wherein the north pole is located at one end and south pole is located at the other end.

13 Claims, 1 Drawing Sheet

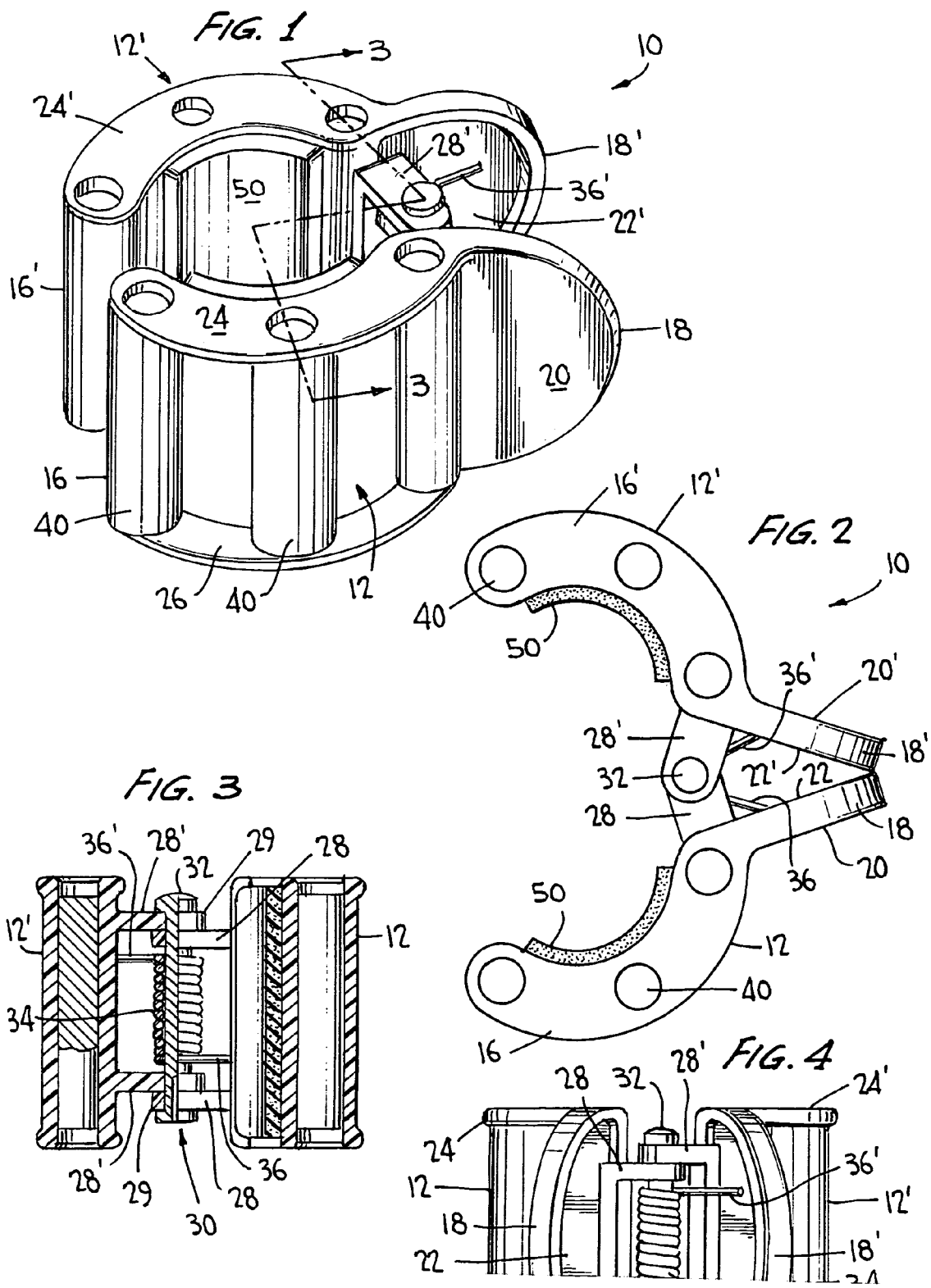

DEVICE TO MAGNETICALLY TREAT BEVERAGES

FIELD OF INVENTION

This invention relates to a device for magnetically treating beverages. More specifically, the present invention is directed to a device to magnetically treat wine which is attached to the neck of a wine bottle.

BACKGROUND OF INVENTION

Wine making is an ancient process involving a complex blend of science and art, often involving trial and error. As such, many improvements have been made over the years in the wine making process to try to improve the taste of the wine. However, there can still be variations in the taste and quality of the wine depending on, for example, the types of grapes used, the amount of other ingredients used, the fermentation process, the barrels used to store and age the wine, the external storage and transport conditions, exposure to light and even time, not all of which prove to be beneficial to the taste and quality of the wine.

As a consequence of the potential inconsistency in the wine making process, many devices have been developed for improving the taste of wine. These devices aim to improve the taste of the wine so that the purchaser may consume the wine, even if it does not have the desired or expected taste when the container is opened, thereby eliminating any waste of the wine.

The prior art discloses various devices to treat wine and other beverages. One such device is the Magne'fique Flav-O-Ring, manufactured by the Magnetizer Group, which is a magnetic ring having a handle and which is placed over the neck of a wine bottle or placed on top of a wine glass as the wine is poured into the glass. When the Magne'fique Flav-O-Ring is placed over the neck of a wine bottle, it must be held in place as the wine is poured or it will fall off of the bottle. When it is placed on top of a glass, it must also be held in place so that it does not fall off of the glass or tip the glass over. As such, the Magne'fique Flav-O-Ring is inconvenient, heavy and awkward to use.

Another such device is the Vintage Enhancer, manufactured by the Bond/Helman Company, which is a cylinder with an electrical adapter. With this device, a wine bottle is be placed into the cylinder, which is then plugged into an electrical outlet for 15 to 40 minutes. The contents are then said to be "aged" and ready to be served. Because of its structure, this device is awkward to use, time-consuming and expensive.

Also known in the prior art is Miyanoo, Japanese Patent No. 401148175 A, which is said to disclose a device and method for aging food and beverages. This device consists of four magnetic units placed in an alternative arrangement, such as North-South and South-North, or varied arrangement in various shapes with semiconductors. The magnetic units are located lengthwise with respect to the body of the device. A vessel containing the beverage is then placed in the device.

Also known is Peiffer, U.S. Pat. No. 6,287,614 B1, which is said to disclose a method and apparatus for improving the organoleptic properties of alcoholic beverages. This device consists of a permanent ring magnet and a beverage container is held within the center diameter or placed upon the surface of the device. The magnet is sandwiched between a top piece and a base holder. In another embodiment, a plurality of rectangular magnets are placed around a conventional pipe.

Also known is Lutzker, U.S. Published Application No. 2003/0003189 A1, which is said to disclose a method and apparatus for improving the taste of wine and other beverages. Wine is treated with a magnetic field preferably formed by at least two magnets. One magnet is positioned at the base of the container holding the wine and another magnet is positioned at the top of the container. The magnet at the top of the container is located in a top piece which acts like a stopper that is inserted into the orifice of the container. The magnets in the stopper and the base should have their fields aligned, preferably such that the stopper has south facing down and the base has north facing up.

Also known is Coates, U.S. Pat. No. 6,008,710, which is said to disclose a magnetic inductor for inducing a magnetic field upon water passing through a pipe. The inductor is annular shape and is secured around the pipe with a hook and loop fastening means.

Also known is Parkyn, U.S. Pat. No. 655,413, which is said to disclose a drinking cup, the whole of which or metal portions of which are magnetized either by a current of electricity or otherwise, that will magnetize a liquid put into it.

Other devices are known for the magnetic treatment of liquids. These devices, along with the devices above, have various shortcomings including being overly complex, requiring significant time to take effect, expensive and difficult to make, expensive to the consumer, difficult to use and unattractive. The shortcomings of these devices are addressed by the present invention.

OBJECTS AND SUMMARY OF THE INVENTION

The present invention is a device to magnetically treat beverages by fastening to a beverage container. The present invention is constructed and arranged to be attached to the neck of a wine bottle to magnetically treat the wine instantly as it is poured out of the bottle. The present invention preferably comprises a fastener having two semi-cylindrical halves, a spring mechanism connecting the semi-cylindrical halves and a plurality of magnets. Each semi-cylindrical half may preferably contain a fastening end and a grasping end. Each fastening end may contain three columns of magnets, wherein the columns of magnets may preferably be substantially evenly spaced in the fastening end of the semi-cylindrical half. The magnets may preferably be aligned so that the polarity runs through the device, that is, north pole to be located at one end and south pole to be located at the other end of the device.

A preferred embodiment of the present invention may be made of plastic and may contain neodymium iron boron magnets. However, the present invention may be constructed of any suitable material and contain any suitable number, type and arrangement of magnets. For example, the devices may contain one magnet enclosed in each semi-cylindrical half.

Thus, it is a primary objective of the present invention to provide a device comprising two semi-cylindrical halves, a spring mechanism and a plurality of magnets to magnetically treat and condition wine instantly as it is poured out of the bottle. The magnetic treatment of the wine can be adjusted by flipping the device to allow a bolder taste to the wine or a smoother and more refined taste to the wine.

Another primary objective of the present invention is to provide a device to magnetically treat and condition wine that is easy and convenient to use. The device of the present invention is light weight and is easy to store and use by the consumer. It can be stored with the user's wine glasses or opener and can be easily fastened to the wine bottle when in use.

Another primary object of the present invention is to provide a device to magnetically treat and condition wine that is aesthetically pleasing to the consumer, unlike the devices presently on the market. The present invention is not heavy, bulky and awkward to use and provides a pleasing appearance to the user when the wine bottle is in the presence of the consumer.

Another primary object of the present invention is to provide a device to magnetically treat and condition wine that is simple and inexpensive to manufacture. The present invention is comprised of few parts and is, therefore, simple and inexpensive to manufacture. The present invention, therefore, will be modestly priced and readily available to wine consumers.

While not being bound by theory, it is believed that by magnetically treating the wine that large macro-molecules or clusters in the fluid are broken up into smaller molecules, thereby improving the taste of the wine.

It is also an objective of the present invention that the device easily attach to the neck of the wine bottle in order to treat and condition the wine so that it creates a change in the way the wine tastes, without adding to or detracting from the actual chemical make-up of the wine itself.

In addition to the novel features and advantages mentioned above, other objects and advantages of the present invention will be readily apparent from the following descriptions of the drawings and exemplary embodiments.

BRIEF DESCRIPTION OF THE DRAWINGS

Referring now to the drawings:

FIG. 1 illustrates a perspective view of the preferred embodiment of the magnetic fastener of the present invention;

FIG. 2 illustrates a plan view of the preferred embodiment of the magnetic fastener of the present invention of FIG. 1;

FIG. 3 illustrates a cross-sectional view along the lines 3—3 of the preferred embodiment of the magnetic fastener of the present invention of FIG. 1; and FIG. 4 illustrates an end view of the preferred embodiment of the magnetic fastener of the present invention of FIG. 1.

DETAILED DESCRIPTION OF THE PREFERRED EMBODIMENTS

The present invention is a device to magnetically treat beverages such as wine. The present invention is constructed and arranged to be fastened to the neck of a beverage container such as the neck of a wine bottle. The preferred embodiment of the device to magnetically treat wine is shown in FIGS. 1–4. The preferred embodiment of the device to magnetically treat wine may preferably be a magnetic fastener 10. The magnetic fastener 10 may have two semi-cylindrical halves 12, 12', a spring mechanism 30, and a plurality of magnets. The semi-cylindrical halves 12, 12' may be in connection with respect to each other by the spring mechanism 30, such that a closed position (see FIG. 1) and an open position (see FIG. 2) of the magnetic fastener 10 may be obtained.

Each semi-cylindrical half 12,12' may preferably have a fastening end 16,16' and a grasping end 18,18'. The fastening end 16,16' of the magnetic fastener 10 preferably surrounds and attaches to a neck of a wine bottle such that the magnetic fastener 10 remains in position around the neck of the wine bottle without assistance from the user until the user desires to remove it. In order for the magnetic fastener 10 to be positioned and attached to the neck of a wine bottle, a user may exert a force on the outer portion 20,20' of each grasping end 18,18' such that the inner portion 22,22' of each grasping end 18,18' comes in substantially close proximity to each other. When this force is exerted to bring the inner portion 22,22' of each grasping end 18,18' in close proximity to each other, the magnetic fastener 10 may then be in the open position such that the fastening end 16,16' of each semi-cylindrical half 12,12' is substantially distant from each other (see FIG. 2). In such position, the magnetic fastener 10 may be placed around the neck of a wine bottle.

Once the magnetic fastener 10 is in position around the neck of a wine bottle, the user may release the force on the outer portion 20,20' of each grasping end 18,18'. As such, due to the spring mechanism 30, the magnetic fastener 10 will return to the closed position (see FIG. 1) and remain substantially secure and attached to the neck of the wine bottle until the user removes it.

The inner surface of the fastening end 16,16' may have a cushioning layer 50. The cushioning layer 50 provides a padding between the inner surface of the fastening end 16,16' of the semi-cylindrical halves 12,12' of the magnetic fastener 10 and the neck of the wine bottle. The cushioning layer 50 may be any suitable padding or cushioning material such as, but not limited to, polyurethane foam and rubber. A presently preferred material is adhesive backed Volara foam.

Each semi-cylindrical half 12,12' of the magnetic fastener 10 may contain various magnets. In the preferred embodiment, the magnets may preferably be arranged into three magnetic columns 40 and enclosed in each semi-cylindrical half 12,12', preferably evenly spaced in each fastening end 16,16' of each semi-cylindrical half 12,12'. However, the magnetic fastener 10 may contain any suitable number and arrangement of magnetic columns 40. Each magnetic column 40 may contain any suitable number and type of magnets. In a preferred embodiment, the magnetic fastener 10 may preferably contain neodymium iron boron magnets, such that each magnetic column 40 may have one neodymium iron boron magnet. In another embodiment, each magnetic column 40 may have eight neodymium iron boron magnets. However, each magnetic column 40 may have any suitable number and type of magnets. The magnets may preferably be aligned so that the polarity runs through the device, that is, north pole to be located on one end (e.g., top end 24,24' of the magnetic fastener 10) and south pole to be located on the other end (e.g., bottom end 26,26' of the magnetic fastener 10). The magnetic fastener 10 is preferably injection molded and the magnets will then preferably be pressed into the semi-cylindrical halves 12,12', preferably after they are assembled.

Each semi-cylindrical half 12,12' may also have two tabs 28,28'. On each semi-cylindrical half 12,12', a first tab 28,28' may be located substantially near the top end 24,24' of each semi-cylindrical half 12,12' substantially near the juncture of the fastening end 16,16' and grasping end 18,18'. On each semi-cylindrical half 12,12', a second tab 28,28' may be located substantially near the bottom end 26,26' of each semi-cylindrical half 12,12' substantially near the juncture of the fastening end 16,16' and grasping end 18,18'. The first tab and the second tab on each semi-cylindrical half 12,12' may be substantially parallel to each other. Additionally, each tab may have an aperture near its free end 29,29', as shown in FIG. 3. While each semi-cylindrical half 12,12' preferably has two tabs, any suitable number of tabs may be used.

As shown in FIGS. 3 and 4, each semi-cylindrical half 12,12' may be in connection with respect to each other by a spring mechanism 30. The spring mechanism 30 may be any suitable spring mechanism. In the present invention, the spring mechanism 30 may contain a spring pin 32 and a spring 34 having a first spring arm 36 and a second spring arm 36'.

In the preferred embodiment, the articulation of the semi-cylindrical halves 12,12' may be accomplished by aligning the tabs 28,28' of the semi-cylindrical halves 12,12' in a parallel and linear arrangement such that the apertures of the tabs 28,28' are in alignment, as shown in FIGS. 3 and 4. The spring pin 32 may then be inserted through the apertures of the tabs, thereby securing the semi-cylindrical halves 12,12' together and in place. The spring 34 of the spring mechanism 30 is preferably a helical spring fitted around the spring pin 32. The spring 34 of the spring mechanism 30 may preferably be a return spring, which makes it possible to return the semi-cylindrical halves 12,12' of the fastener 10 to the closed position.

Each end of the spring 34 may have a spring arm 36,36'. The first spring arm 36 may be adjacent to, in close proximity to and/or attached to the inner portion 22 of the grasping end 18 of one semi-cylindrical half 12. The second spring arm 36' may be adjacent to, in close proximity to and/or attached to the inner portion 22' of the grasping end 18' of the other semi-cylindrical half 12'. As a force is exerted on the outer portion 20,20' of each grasping end 18,18' (as described above), the inner portion 22,22' of each grasping end 18,18' exerts a force on the respective spring arm 36,36', thereby activating the spring mechanism 30. When the force is released, the spring mechanism is deactivated and the magnetic fastener 10 returns to the closed position (as shown in FIG. 1).

The preferred material used to construct the magnetic fastener 10 of the present invention may be plastic. A presently preferred plastic is nylon and the device is made by injection molding. The plastic can be colored to provide a pleasing appearance to the user. However, any suitable material may be used to construct the magnetic fastener 10. Additionally, each half of the magnetic fastener 10 of the preferred embodiment is semi-cylindrical in shape, but any suitable shape and configuration may be used. Also, the magnetic fastener 10 of the present invention may be used around the neck of any type of bottle or around any apparatus containing any suitable liquid to be treated and conditioned.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A device to magnetically treat beverages, comprising:
   two semi-cylindrical halves, each said semi-cylindrical half having a fastening end and a grasping end, wherein said grasping end extends from said fastening end and is constructed and arranged for opening and closing said fastening end of said device;
   a spring mechanism, said spring mechanism connecting said semi-cylindrical halves; and
   a plurality of magnets, each of said magnets having a north pole and a south pole, said plurality of magnets arranged in said semi-cylindrical halves, wherein said plurality of magnets are arranged into three magnetic columns in each said fastening end of each said semi-cylindrical half.

2. The device to magnetically treat beverages according to claim 1, wherein said magnetic columns are aligned so that polarity runs through the device such that said north poles of said magnets in said magnetic columns are located on a top end of said semi-cylindrical halves and said south poles of said magnets in said magnetic columns are located on a bottom end of said semi-cylindrical halves.

3. The device to magnetically treat beverages according to claim 2, wherein said magnetic columns are substantially evenly spaced in said fastening end of each semi-cylindrical half.

4. A device to magnetically treat beverages, comprising:
   two semi-cylindrical halves, each said semi-cylindrical half having a fastening end and a grasping end, wherein said grasping end extends from said fastening end and is constructed and arranged for opening and closing said fastening end of said device;
   a spring mechanism, said spring mechanism connecting said semi-cylindrical halves; and
   a plurality of magnets, each of said magnets having a north pole and a south pole, said plurality of magnets arranged in said semi-cylindrical halves,
   wherein each of said semi-cylindrical halves has at least two tabs, wherein said first tab is substantially near a top end of each of said semi-cylindrical halves near a juncture of said fastening end and said grasping end, wherein said second tab is substantially near a bottom end of each of said semi-cylindrical halves near a juncture of said fastening end and said grasping end,
   wherein each of said tabs has a free end and an aperture near said free end,
   wherein said tabs are substantially parallel such that said apertures are in a substantially parallel and linear arrangement, wherein said tabs join said semi-cylindrical halves to each other via said spring mechanism,
   wherein said spring mechanism is a return spring mechanism comprising:
   a spring, said spring being a helical spring having a first spring arm and a second spring arm; and
   a spring pin;
   wherein said spring pin is inserted into said apertures of said tabs of said semi-cylindrical halves thereby connecting said semi-cylindrical halves together and wherein said spring is fitted around said spring pin such that said first spring arm is adjacent to an inner portion of said grasping end on one of said semi-cylindrical halves and said second spring arm is adjacent to an inner portion of said grasping end on the other of said semi-cylindrical halves.

5. The device to magnetically treat beverages according to claim 4, wherein said fastening end is constructed and arranged to be fastened to a neck of a beverage container.

6. The device to magnetically treat beverages according to claim 4, wherein said plurality of magnets are arranged into three magnetic columns in each said fastening end of each said semi-cylindrical half.

7. The device to magnetically treat beverages according to claim 6, wherein said magnetic columns are aligned so that polarity runs through the device such that said north poles of said magnets are located on a top end of said semi-cylindrical halves and said south poles of said magnets are located on a bottom end of said semi-cylindrical halves.

8. The device to magnetically treat beverages according to claim 7, wherein said magnetic columns are substantially evenly spaced in said fastening end of each semi-cylindrical half.

9. The device to magnetically treat beverages according to claim 8, further comprising:
a cushioning layer on an inner surface of each fastening end of each said semi-cylindrical half.

10. The device to magnetically treat beverages according to claim 9, wherein said semi-cylindrical halves are plastic.

11. A device to magnetically treat beverages, comprising:
two semi-cylindrical halves, each said semi-cylindrical half having a fastening end and a grasping end, wherein said grasping end extends from said fastening end and is constructed and arranged for opening and closing said fastening end of said device;
a spring mechanism, said spring mechanism connecting said semi-cylindrical halves; and
a plurality of magnets, each of said magnets having a north pole and a south pole, said plurality of magnets arranged in said semi-cylindrical halves,
wherein said spring mechanism is a return spring mechanism comprising:
a spring, said spring being a helical spring having a first spring arm and a second spring arm; and
a spring pin;
wherein each of said semi-cylindrical halves has at least two tabs, wherein said first tab is substantially near a top end of each of said semi-cylindrical halves near a juncture of said fastening end and said grasping end, wherein said second tab is substantially near a bottom end of each of said semi-cylindrical halves near a juncture of said fastening end and said grasping end,
wherein said spring pin is inserted into an aperture on each of said tabs of said semi-cylindrical halves thereby connecting said semi-cylindrical halves together and wherein said spring is fitted around said spring pin such that said first spring arm is adjacent to an inner portion of said grasping end on one of said semi-cylindrical halves and said second spring arm is adjacent to an inner portion of said grasping end on the other of said semi-cylindrical halves.

12. A device to magnetically treat beverages comprising:
two halves, each said half having a fastening end and a grasping end, wherein said grasping end extends from said fastening end and is constructed and arranged for opening and closing said fastening end of said device;
a spring mechanism, said spring mechanism connecting said halves; and
a plurality of magnets, each of said magnets having a north pole and a south pole, said plurality of magnets arranged in said halves, wherein said plurality of magnets are arranged into three magnetic columns in each said fastening end of each said half, and wherein said magnetic columns are aligned so that polarity runs through the device such that said north poles of said magnets are located on a top end of said halves and said south poles of said magnets are located on a bottom end of said halves.

13. A device to magnetically treat beverages comprising:
two halves, each said half having a fastening end and a grasping end, wherein said grasping end extends from said fastening end and is constructed and arranged for opening and closing said fastening end of said device;
a spring mechanism, said spring mechanism connecting said halves; and
a plurality of magnets, each of said magnets having a north pole and a south pole, said plurality of magnets arranged in said halves,
wherein said spring mechanism is a return spring mechanism comprising:
a spring, said spring being a helical spring having a first spring arm and a second spring arm; and
a spring pin,
wherein each said half has at least two tabs, wherein said first tab is substantially near a top end of each said half near a juncture of said fastening end and said grasping end, wherein said second tab is substantially near a bottom end of each said half near a juncture of said fastening end and said grasping end,
wherein said spring pin is inserted into an aperture on each of said tabs of said halves thereby connecting said halves together and wherein said spring is fitted around said spring pin such that said first spring arm is adjacent to an inner portion of said grasping end on one of said halves and said second spring arm is adjacent to an inner portion of said grasping end on the other of said halves.

* * * * *